(12) United States Patent
Andres et al.

(10) Patent No.: US 8,258,747 B2
(45) Date of Patent: Sep. 4, 2012

(54) METHOD FOR AUTOMATIC BATTERY CONTROLLER IDENTIFICATION AND CELL INDEXING VIA A MULTI-PURPOSE SIGNAL LINE

(75) Inventors: Peter Andres, Ginsheim-Gustavsburg (DE); Ryan M. Frakes, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 302 days.

(21) Appl. No.: 12/779,882

(22) Filed: May 13, 2010

(65) Prior Publication Data

US 2011/0279087 A1  Nov. 17, 2011

(51) Int. Cl.
*H01M 10/44* (2006.01)
*H01M 10/46* (2006.01)
(52) U.S. Cl. ........................................ 320/116
(58) Field of Classification Search .................. 320/107, 320/116, 117, 134, 136
See application file for complete search history.

(56) References Cited

U.S. PATENT DOCUMENTS

| 5,606,242 | A | * | 2/1997 | Hull et al. ..................... 320/106 |
| 5,796,239 | A | * | 8/1998 | van Phuoc et al. ............ 320/107 |
| 2008/0272739 | A1 | * | 11/2008 | Carrier et al. .................. 320/134 |

* cited by examiner

*Primary Examiner* — Edward Tso
(74) *Attorney, Agent, or Firm* — John A. Miller; Miller IP Group, PLC

(57) ABSTRACT

A method and system for identifying individual cell monitoring controllers in an electric vehicle battery pack. Several cell monitoring controllers are serially connected to each other and to a master battery pack controller via a signal line, which is also used for communicating alarm signals between the controllers. The master battery pack controller sends a wake-up signal on the signal line. The first cell monitoring controller in the signal line wiring route receives the wake-up signal and receives an identification number from the master battery pack controller. Only then does the first cell monitoring controller allow the wake-up signal to be passed along to the second cell monitoring controller, which activates and receives its identification number, and so forth. In this way, identical cell monitoring controllers can be used in a battery pack, yet each cell monitoring controller can be uniquely identified by the master battery pack controller.

20 Claims, 3 Drawing Sheets

METHOD FOR AUTOMATIC BATTERY CONTROLLER IDENTIFICATION AND CELL INDEXING VIA A MULTI-PURPOSE SIGNAL LINE

BACKGROUND OF THE INVENTION

1. Field of the Invention

This invention relates generally to a method and system for identifying cell monitoring controllers in a battery pack and, more particularly, to a method and system for identifying cell monitoring controllers in an electric or hybrid vehicle battery pack which uses a multi-purpose signal line to activate and identify each cell monitoring controller in sequence, thus allowing use of identical controllers throughout the battery pack.

2. Discussion of the Related Art

Electric vehicles and gasoline/electric hybrid vehicles are rapidly gaining popularity in today's automotive marketplace. Electric and hybrid vehicles offer several desirable features, such as reduced emissions, reduced usage of petroleum-based fuels, and potentially lower operating costs. A key component of both electric and hybrid vehicles is the battery pack. Battery packs in these vehicles typically consist of numerous interconnected cells, operating at a relatively high voltage, and delivering a lot of power on demand. In order to maximize vehicle driving range and maximize battery pack life, the cells in the battery pack must be controlled during charging and discharging so that all cells are maintained at a fairly uniform charge level.

In order to monitor and control the charging and discharging of the cells in the battery pack, cell monitoring controllers are used. Because of the physical size of battery packs in electric and hybrid vehicles, several cell monitoring controllers are often needed, where each controller has responsibility for a number of cells in the battery pack. In such a configuration, a master battery pack controller is used to communicate with the multiple cell monitoring controllers. For this arrangement to be effective, it is necessary for the master battery pack controller to be able to identify each of the cell monitoring controllers, and for the cell monitoring controllers in turn to be able to index each cell in the battery pack. The need to uniquely identify each cell monitoring controller has traditionally been met by uniquely configuring each cell monitoring controller in the battery pack, where the unique configuration could be accomplished with hardware or software in the cell monitoring controllers. But making each cell monitoring controller unique has the dual disadvantage of preventing use of a common part for all cell monitoring controllers in the battery pack, and also adding complexity to manufacturing and service operations which must then carefully distinguish between identical-looking parts.

There is a need for an improved method of identifying individual cell monitoring controllers in a battery pack which does not require each controller to be uniquely configured. Such a method could yield cost savings for manufacturers of electric and hybrid vehicles, through part number reduction, increased volume for a common part, and simplification of manufacturing and service operations.

SUMMARY OF THE INVENTION

In accordance with the teachings of the present invention, a method and system are disclosed for identifying individual cell monitoring controllers in an electric or hybrid vehicle battery pack. Several cell monitoring controllers are connected to each other and to a master battery pack controller via a low-voltage signal line, which is also used for sending alarm signals between the controllers. When the master battery pack controller wants to activate and identify the cell monitoring controllers, it sends a wake-up signal on the signal line. The first cell monitoring controller in the signal line wiring route receives the wake-up signal and receives an identification number from the master battery pack controller. Only then does the first cell monitoring controller allow the wake-up signal to be passed along to the second cell monitoring controller, which wakes up and receives its identification number, and so forth. In this way, identical cell monitoring controllers can be used in a battery pack, yet each cell monitoring controller can be uniquely identified by the master battery pack controller.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method and system for automatic battery controller identification and cell indexing via a multi-purpose signal line is merely exemplary in nature, and is in no way intended to limit the invention or its applications or uses. For example, the present invention has particular application for electric and hybrid vehicle battery packs. However, the method of the invention could be applied to other types of battery packs, such as those used in forklifts and other utility vehicles, electrical storage and battery back-up power devices, and other industries.

Electric vehicles and gasoline/electric hybrid vehicles use high-capacity battery packs to store the electrical energy necessary for driving the vehicles a reasonable distance between recharging events. Battery technology continues to develop, and many different battery pack system designs are possible, but one requirement that most electric and hybrid vehicle battery packs have in common is the need for advanced electronic monitoring and controls.

Figure 1:
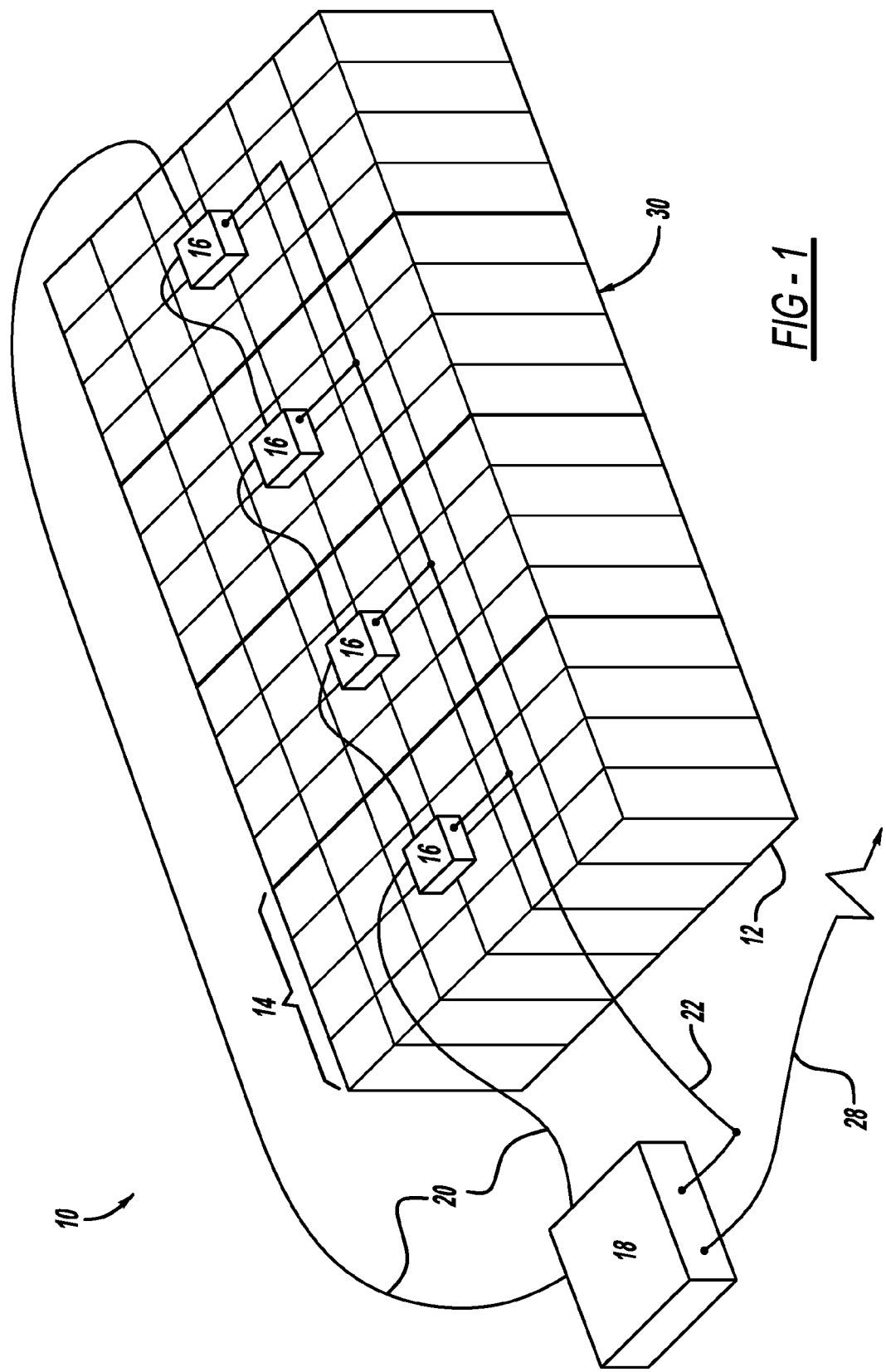
FIG. 1 is a diagram of a battery pack and controllers for an electric or hybrid vehicle.

FIG. 1 is a diagram of a battery pack system 10 which is representative of the type that might be used in an electric or hybrid vehicle. The battery pack system 10 includes a battery pack 30 having an array of individual cells 12, which are grouped into sections 14. As shown in FIG. 1, the sections 14 each comprise a four-by-six block of cells 12, but this is merely an example; the number of cells 12 per section 14 could be larger or smaller than 24. Each of the sections 14 is equipped with a cell monitoring controller (CMC) 16. The cell monitoring controllers 16 perform monitoring and balancing functions, such as monitoring voltage and temperature in each cell 12, and controlling charging and discharging operations to keep the state of charge balanced between the cells 12. The battery pack system 10 also includes a master battery pack controller 18, which controls overall operation of the system 10, including charging and discharging current.

The master battery pack controller 18 is connected to the CMCs 16 via a signal line 20. The signal line 20 connects the master battery pack controller 18 and the CMCs 16 in a serial loop, and is used for certain types of signaling and alarm functions. The signal line 20 may also be used for other functions, such as providing power to the CMCs 16. The master battery pack controller 18 also communicates with the CMCs 16 via a network 22, and with other controllers in the vehicle via a network 28. The networks 22 and 28 can use any suitable protocol, such as controller area network (CAN), and the networks 22 and 28 could also be combined into a single network if desired. The high-power wiring which handles charging and discharging current to and from the cells 12 is not shown in FIG. 1. Power supply wiring for the master battery pack controller 18 is also not shown in FIG. 1, as it is not relevant to the invention.

Battery pack configurations differ from one vehicle design to another, and the number of the cell sections 14 and the number of the cell monitoring controllers 16 is one factor that can vary. But regardless of the number of the cell monitoring controllers 16 used for the battery pack 30, it is critical that the master battery pack controller 18 be able to identify and communicate with each individual cell monitoring controller 16. This is necessary because factors such as voltage, current, and temperature may need to be monitored and controlled for each individual cell 12 within each section 14. The only way to monitor and control all of the cells 12, whether individually or in small groups, is for each cell monitoring controller 16 to have a unique identity in the battery pack system 10, and for each cell monitoring controller 16 to have an index or map of all of the cells 12 which are under its control.

Traditional methods of identifying each cell monitoring controller 16 include configuring each cell monitoring controller 16 with a unique wiring harness or grounding strategy, equipping each cell monitoring controller 16 with a unique resistor network on a circuit board, or programming each cell monitoring controller 16 with a unique piece of software or firmware calibration. While these methods achieve the goal of rendering each cell monitoring controller 16 to be uniquely identifiable by the master battery pack controller 18, they require each cell monitoring controller 16 to be assembled differently, which means each cell monitoring controller 16 in the battery pack system 10 must have a different part number. The traditional methods also require each cell monitoring controller 16 to be distinguished and placed in its proper location when the battery pack system 10 is assembled, which creates an opportunity for assembly error. Extra wiring connections may also have to be made, differently for each cell monitoring controller 16, in order to establish uniqueness. In short, the traditional methods of uniquely identifying cell monitoring controllers 16, by requiring each cell monitoring controller 16 in the battery pack system 10 to be uniquely configured, drive increased piece price in the form of more part numbers, and drive increased assembly price for the system 10 in the form of more wiring connections and more required error-proofing steps during assembly.

Figure 2:
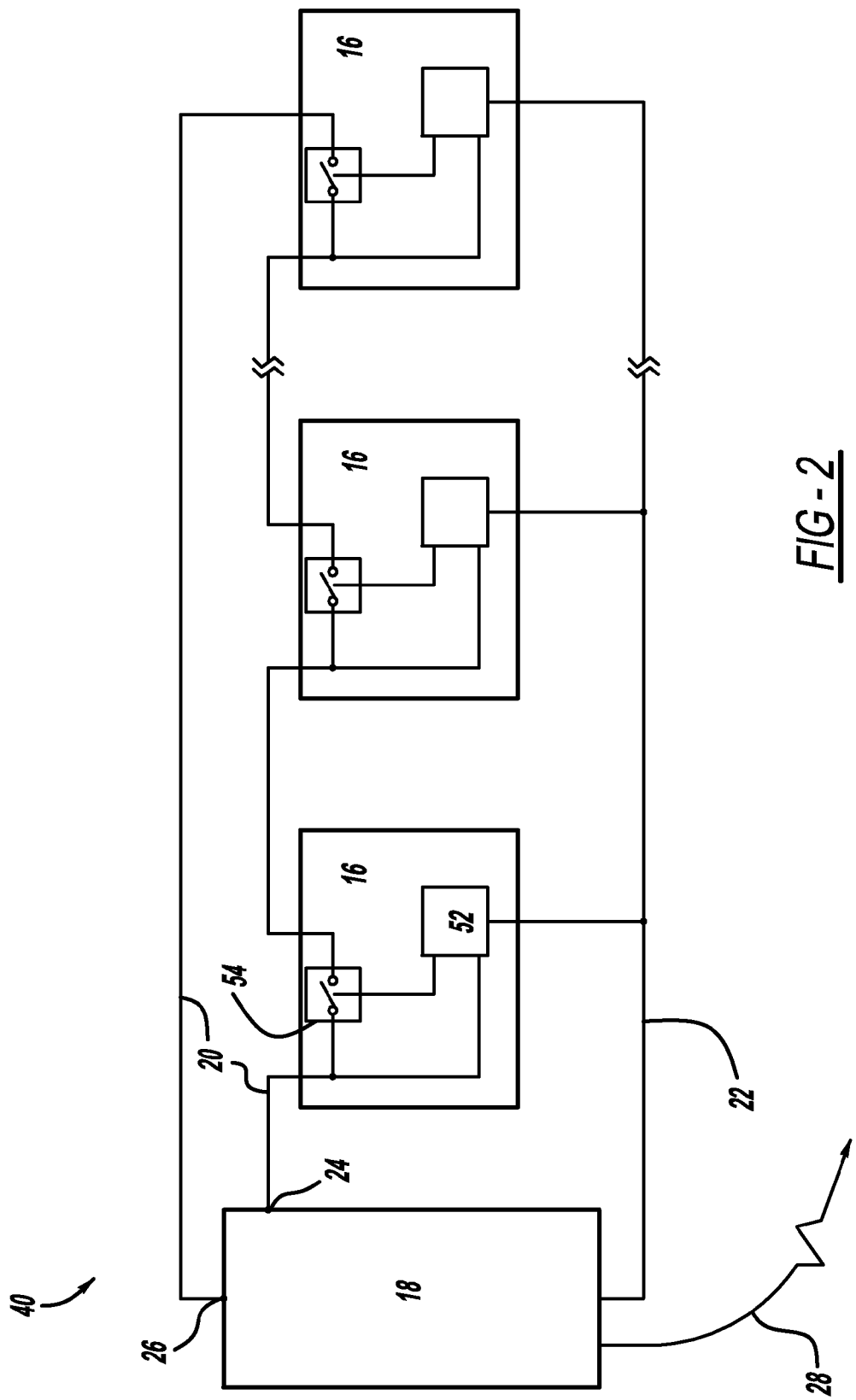
FIG. 2 is a schematic diagram of a system containing a master battery pack controller and cell monitoring controllers for a battery pack, showing how the cell monitoring controllers can be activated and identified.

FIG. 2 is a schematic diagram of a system 40 for automatically activating and identifying a series of cell monitoring controllers 16. In the system 40, like elements to the system 10 retain their reference number from FIG. 1. The system 40 includes first, second, and $n^{th}$ cell monitoring controllers 16, along with the master battery pack controller 18, the signal line 20, and the networks 22 and 28 as shown in FIG. 1. In the system 40, each of the cell monitoring controllers 16 is an identical part. That is, the individual parts are not uniquely configured with hardware or software. Rather, the routing of the signal line 20 is used to activate and identify each cell monitoring controller 16 in turn. The cell monitoring controllers 16 are labeled CMC1, CMC2, and CMCn in FIG. 2, based on their position in the routing of the signal line 20.

Each cell monitoring controller 16 includes a processor or central processing unit (CPU) 52. The CPU 52 in each cell monitoring controller 16 manages the cell monitoring and control activities, along with communications and most other functions of the cell monitoring controller 16. Each cell monitoring controller 16 also contains a switching element, such as switch 54. The switch 54 can be any electrical or electronic component capable of opening and closing a circuit, such as a switch, a relay, or other suitable component.

When the system 40 is off or in a standby mode, the CPU 52 is idle, and the switch 54 is in an open position in each cell monitoring controller 16. When the battery pack 30 and the system 40 need to be activated for vehicle operations, the master battery pack controller 18 sends a wake-up signal from port 24, over the signal line 20. The wake-up signal could be in the form of a voltage being set to a designated high value, such as 12 volts, or the wake-up signal could be of any other suitable type. The wake-up signal arrives at the cell monitoring controller 16 which is first in the routing of the signal line 20. Because the switch 54 is open, the wake-up signal does not continue downstream to the next cell monitoring controller 16. The wake-up signal is received by the CPU 52, which wakes up, or becomes active.

The CPU 52 then requests an identification number from the master battery pack controller 18, via the network 22. The identification number does not literally have to be just a number, but can be any unique identifier, which could be a number, an alphanumeric code, or otherwise. The term identification number, and numeric examples as such, are used herein to help clarify the discussion of the sequential identification process. The master battery pack controller 18 provides an identification number upon request. When the CPU 52 receives its identification number, it then closes the switch 54, so that the wake-up signal can continue down the signal line 20 to the next cell monitoring controller 16. The CPU 52 also begins its cell monitoring and control functions upon waking up.

The next, or second, cell monitoring controller 16 is activated in the same way as the first cell monitoring controller 16 was—waking up, requesting and receiving its identification number from the master battery pack controller 18, and allowing the wake-up signal to continue downstream on the signal line 20. The master battery pack controller 18 assigns a unique identification number upon each request from a cell monitoring controller 16. When the last cell monitoring controller 16 in the routing of the signal line 20 wakes up, receives its identification number, and closes its switch 54, the wake-up signal continues along the signal line 20 and returns to the master battery pack controller 18 at port 26. When the master battery pack controller 18 detects the wake-up signal at the port 26, it knows that all cell monitoring controllers 16 have been activated, and the battery pack 30 and the system 40 are in an active state. The master battery pack controller 18 can also determine that all cell monitoring controllers 16 have been activated by virtue of the fact that it has issued identification numbers to all of the cell monitoring controllers 16 that it knows exist in the system 40.

It can be seen from the preceding discussion that each cell monitoring controller 16 in the system 40 is an identical part, operating in an identical fashion in the wake-up sequence, yet each cell monitoring controller 16 assumes a unique identity from the master battery pack controller 18. With each cell monitoring controller 16 uniquely identified by the master battery pack controller 18, complete indexing of all cells 12 in the battery pack 30 is possible. For example, if each cell monitoring controller 16 is responsible for 24 individual cells 12, then the first cell monitoring controller 16 can assign the numbers 1-24 to its cells 12, the second cell monitoring controller 16 can assign the numbers 25-48, and so forth. This indexing methodology enables complete monitoring and control of all cells 12 in the battery pack 30, for conditions such as voltage and temperature in each cell 12, and energy management throughout the battery pack 30.

When the vehicle is turned off and the battery pack 30 is to return to off or standby mode, the master battery pack controller 18 simply removes the wake-up signal from the signal line 20, which may be accomplished by setting the voltage on the signal line 20 back down to a designated low voltage value, or otherwise as appropriate. The removal of the wake-up signal causes the CPU 52 in each cell monitoring controller 16 to return to an idle state and open its switch 54.

Figure 3:
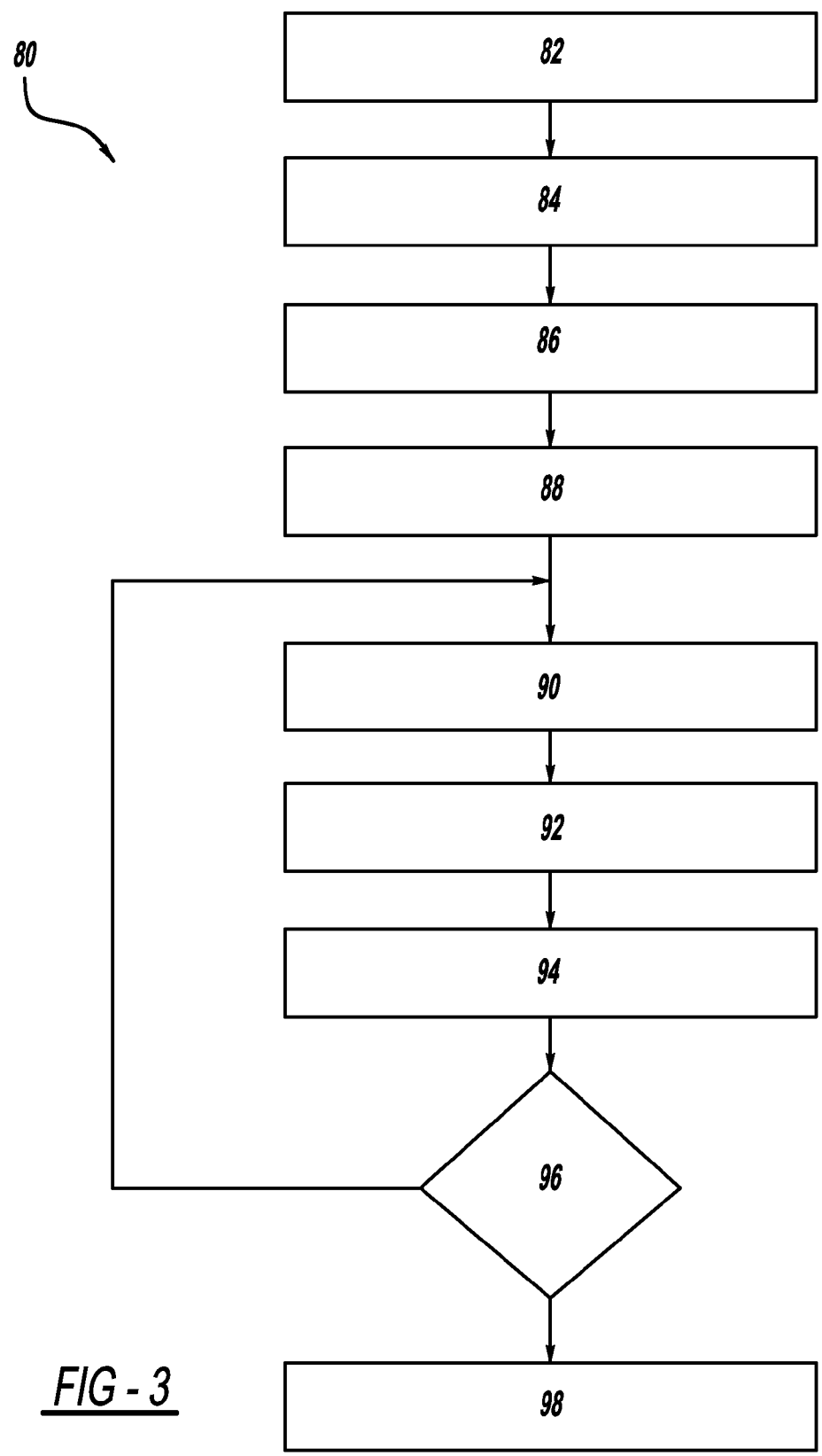
FIG. 3 is a flow chart diagram of a process which can be used with the system of FIG. 2 to activate and identify each cell monitoring controller in the system.

FIG. 3 is a flow chart diagram 80 of a process for activating and identifying a series of cell monitoring controllers 16 in a system, such as the system 40 of FIG. 2. The process begins with the battery pack 30 off or in standby mode at box 82. The battery pack 30 would either be off or in standby mode if the vehicle had been sitting idle for some period of time, such as overnight. At box 84, a driver requests the vehicle to start, which could be done by pushing a start button, or turning a key, or pressing an accelerator pedal, or performing whatever action is needed to begin operation of the vehicle. Whether the vehicle is an electric or hybrid vehicle, operating the vehicle will require the battery pack 30 to be activated. At box 86, the vehicle start operation signals the master battery pack controller (MBPC) 18 to switch to active mode. The signal or command to the master battery pack controller 18 could be sent on the network 28 by another controller in the vehicle. At box 88, the master battery pack controller 18 sends a wake-up signal from the port 24 on the signal line 20. Based on the routing of the signal line 20, the wake-up signal arrives at the first cell monitoring controller 16.

At box 90, the first cell monitoring controller 16 receives the wake-up signal from the master battery pack controller 18 and wakes up, or activates its CPU 52, as described previously. At box 92, the first cell monitoring controller 16 requests an identification number from the master battery pack controller 18, and receives the identification number from the master battery pack controller 18. In this example, the first cell monitoring controller 16 could receive an identification number of 1, or any other suitable identifier. The communications of the box 92 take place over the network 22. After the first cell monitoring controller 16 receives its identification number at the box 92, the CPU 52 in the first cell monitoring controller 16 recognizes that it is permitted to pass along the wake-up signal on the signal line 20, which it does at box 94 by closing the switch 54.

At decision diamond 96, either the wake up cycle is repeated for subsequent cell monitoring controllers 16, or the process drops through to termination, depending on whether there are any more cell monitoring controllers 16 remaining downstream on the signal line 20. If there are more cell monitoring controllers 16 to be activated and identified, the process loops back to the box 90, where the next cell monitoring controller 16 in the signal line routing receives the wake-up signal and activates its CPU 52. Each subsequent cell monitoring controller 16 wakes up, requests and receives a unique identification number, and passes the wake-up signal along, as described previously. The master battery pack controller 18 assigns a unique identification number to each successive cell monitoring controller 16 as it is activated.

The process continues to loop through the boxes 90, 92, and 94 until there are no more cell monitoring controllers 16 to be activated at the decision diamond 96, at which point the wake-up signal returns to the master battery pack controller 18. At box 98, the process completes with the battery pack 30 and the system 40 in an active state, and the vehicle is ready to be driven. In the active state, the master battery pack controller 18 can identify and communicate with all cell monitoring controllers 16, and the cell monitoring controllers 16 are actively monitoring the conditions of all cells 12 which are under their control. Also, with the activation and identification process complete, the signal line 20 is used during vehicle operations for its other purposes, such as communication of alarm signals from the cell monitoring controllers 16 to the master battery pack controller 18. The master battery pack controller 18 receives the alarm signals at the port 26.

It is emphasized that, although the cell monitoring controllers 16 are assigned different identification numbers in the process of the flow chart diagram 80, there are no physical or configuration differences between them. That is, all of the cell monitoring controllers 16 in the system 40 are identical parts. It is the circuitry internal to the cell monitoring controllers 16, and the routing of the signal line 20, which enables each cell monitoring controller 16 to be uniquely identified in the system 40. This innovative arrangement allows for simplification and cost reduction in high power battery packs of the type used in electric and hybrid vehicles, which can only help manufacturers of such vehicles achieve even more success in the marketplace.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for activating and identifying cell monitoring controllers in a battery pack, said method comprising:
   providing a master battery pack controller and a plurality of identical cell monitoring controllers, where the master battery pack controller and the cell monitoring controllers are connected by a signal line in a serial loop, and the master battery pack controller and the cell monitoring controllers are also in communication via a network;
   receiving a wake-up signal on the signal line by a first cell monitoring controller from the master battery pack controller;
   performing wake-up activities by the first cell monitoring controller;
   passing the wake-up signal along the signal line by the first cell monitoring controller to subsequent cell monitoring controllers that also perform wake-up activities; and
   terminating the activation process with the battery pack and all cell monitoring controllers in an active state.

2. The method of claim 1 wherein performing wake-up activities by the first cell monitoring controller and the subsequent cell monitoring controllers includes:
   activating a processor;
   requesting and receiving a unique identification number from the master battery pack controller; and
   commencing monitoring and control of a plurality of battery cells in the battery pack.

3. The method of claim 2 wherein commencing monitoring and control of the plurality of battery cells in the battery pack includes monitoring conditions of each battery cell, and controlling a charging and discharging current for each battery cell.

4. The method of claim 3 wherein monitoring conditions of each battery cell includes monitoring temperature and voltage.

5. The method of claim 2 wherein requesting and receiving a unique identification number from the master battery pack controller are performed by communicating via the network.

6. The method of claim 1 wherein passing the wake-up signal along the signal line by the first cell monitoring controller to the subsequent cell monitoring controllers includes closing a switch to allow the wake-up signal to continue along the signal line.

7. The method of claim 1 further comprising using the signal line for communication of alarm conditions to the master battery pack controller by the first cell monitoring controller and the subsequent cell monitoring controllers.

8. The method of claim 1 wherein receiving a wake-up signal on the signal line from the master battery pack controller includes setting a voltage on the signal line to a predefined high value.

9. The method of claim 1 wherein the battery pack is used in an electric or hybrid vehicle.

10. A system for activating and identifying cell monitoring controllers in a battery pack, said system comprising:
   a master battery pack controller for controlling overall operation of the battery pack;
   a plurality of identical cell monitoring controllers configured to monitor and control a plurality of cells in the battery pack, where the cell monitoring controllers can be sequentially activated and uniquely identified by receiving a wake-up signal from the master battery pack controller;
   a signal line for sending the wake-up signal from the master battery pack controller to the cell monitoring controllers and for sending alarm signals from the cell monitoring controllers to the master battery pack controller, said signal line connecting the master battery pack controller and the cell monitoring controllers in a serial loop; and
   a network for communicating between the master battery pack controller and the cell monitoring controllers.

11. The system of claim 10 wherein the cell monitoring controllers each include a switch for making or breaking connectivity of the signal line, and a processor for monitoring and controlling the plurality of cells in the battery pack and for performing a set of wake-up functions.

12. The system of claim 11 wherein the set of wake-up functions includes requesting and receiving a unique identification number from the master battery pack controller, and closing the switch to allow the wake-up signal to be sent along the signal line.

13. The system of claim 10 wherein the cell monitoring controllers monitor conditions of each cell, and control a charging and discharging current for each cell.

14. The system of claim 13 wherein the conditions of each cell include temperature and voltage.

15. The system of claim 10 wherein the wake-up signal comprises a voltage on the signal line being set to a predefined high value.

16. The system of claim 10 wherein the network uses a controller area network protocol.

17. A battery pack system for an electric or hybrid vehicle, said battery pack system comprising:
   a plurality of battery cells arranged into sections;
   a master battery pack controller for controlling overall operation of the battery pack system;
   a plurality of identical cell monitoring controllers configured to monitor and control the plurality of battery cells, including one cell monitoring controller for each section of battery cells, where the cell monitoring controllers can be sequentially activated and uniquely identified by receiving a wake-up signal from the master battery pack controller;
   a signal line for sending the wake-up signal from the master battery pack controller to the cell monitoring controllers and for sending alarm signals from the cell monitoring controllers to the master battery pack controller, said signal line connecting the master battery pack controller and the cell monitoring controllers in a serial loop; and
   a network for communicating between the master battery pack controller and the cell monitoring controllers.

18. The battery pack system of claim 17 wherein the cell monitoring controllers each include a switch for making or breaking connectivity of the signal line, and a processor for monitoring and controlling the plurality of battery cells and for performing a set of wake-up functions.

19. The battery pack system of claim 18 wherein the set of wake-up functions includes requesting and receiving a unique identification number from the master battery pack controller, and closing the switch to allow the wake-up signal to be sent along the signal line.

20. The battery pack system of claim 17 wherein the network uses a controller area network protocol.

* * * * *